United States Patent [19]

Shoji et al.

[11] Patent Number: 4,629,669

[45] Date of Patent: Dec. 16, 1986

[54] METHOD OF FORMING SUPERIMPOSED COLOR IMAGES

[75] Inventors: Hisashi Shoji; Satoshi Haneda; Seiichiro Hiratsuka, all of Hachioji, Japan

[73] Assignee: Konishiroku Photo Industry Co., Ltd., Japan

[21] Appl. No.: 695,488

[22] Filed: Jan. 28, 1985

[30] Foreign Application Priority Data

Jan. 30, 1984 [JP] Japan ................................ 59-13462
Jan. 30, 1984 [JP] Japan ................................ 59-13463
Jan. 30, 1984 [JP] Japan ................................ 59-13465
Apr. 12, 1984 [JP] Japan ................................ 59-71888

[51] Int. Cl.$^4$ ............................................. G03G 13/09
[52] U.S. Cl. ................................... 430/47; 430/122
[58] Field of Search .................... 430/120, 122, 47; 118/653, 658, 657

[56] References Cited

U.S. PATENT DOCUMENTS

| | | | |
|---|---|---|---|
| 3,893,414 | 7/1975 | Hudson et al. | 118/658 |
| 3,961,951 | 6/1976 | Mayer et al. | 430/120 |
| 4,337,306 | 6/1982 | Kanbe et al. | 430/120 |
| 4,553,500 | 11/1985 | Itaya et al. | 118/657 |

*Primary Examiner*—John L. Goodrow
*Attorney, Agent, or Firm*—Jordan B. Bierman

[57] ABSTRACT

A colored image-forming method is initiated by forming a latent image on an image retainer in the form of a rotatable drum. Then, a powdered toner is caused to fly from a developer-feeding carrier and adhere to the retainer in the presence of an oscillating electric field. Similar steps are carried out using different powdered toners to superimpose toner images of different colors on the retainer. Each developer-feeding carrier has a magnet member to exert a magnetic force to the corresponding toner. A magnetic attracting force acting between the toner particles and the magnet member becomes smaller according to the increase of the number of the repetition of the above steps.

26 Claims, 5 Drawing Figures

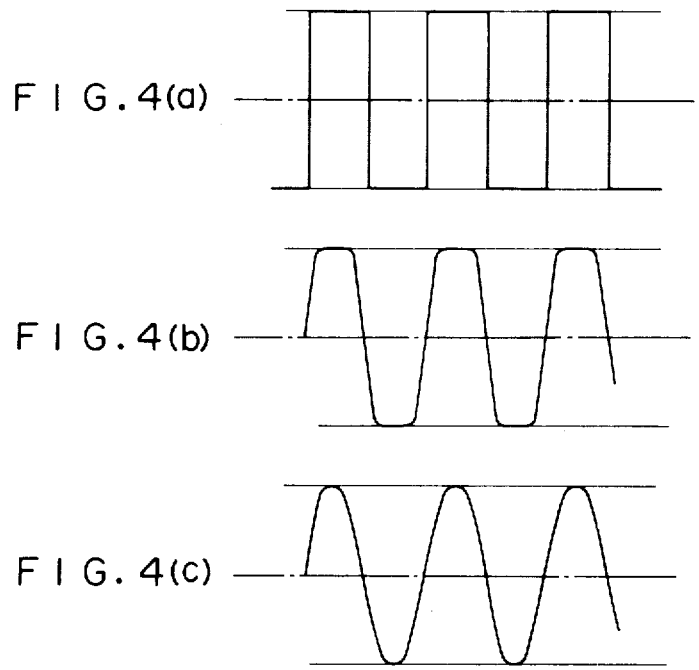
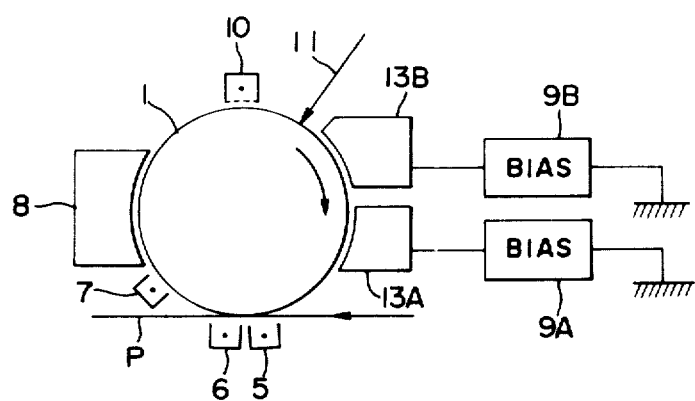

METHOD OF FORMING SUPERIMPOSED COLOR IMAGES

BACKGROUND OF THE INVENTION

1. Field of the Invention

The present invention relates to an image-forming method in a laser color printer, colored image copying machine, or the like and, more particularly, to a method of forming images by superimposing a plurality of toner images on an image retainer.

2. Description of the Prior Art

Copying machines have been known in which a colored original picture is illuminated with light, and the resultant light is decomposed into several components by color filters. The light components are then caused to fall on an electrically charged image retainer to form an electrostatic image, which is then developed by applying a powdered toner of a color, such as a yellow pigment, magenta, Cyan, or a black pigment, which corresponds to one of the color filters. The obtained toner image is transferred to paper. Subsequently, a second electrostatic image is formed in the same manner, and this image is then developed by applying a powdered toner of another color. The resultant toner image is transferred to the same paper. Similar operations are performed to superimpose toner images on the paper. In this kind of copier, each time one development in one color is completed, the toner image is transferred to the paper, thus necessitating a mechanism for rotating or reciprocating the paper. This makes the machine bulky. Also, the time necessary to form the whole image is lengthened. Another problem is that it is difficult to make coincident positions at which toner images are transferred to the paper.

In an attempt to overcome the foregoing problems with the aforementioned copier, an electrophotographic printer has been proposed in Japanese Patent Laid-open No. 144452/1981, where toner images are superimposed on an image retainer and the superimposed images are subsequently transferred to paper at once. In this apparatus, in order to prevent toner images previously formed on the retainer from being disturbed by later developments, the powdered toner is caused to make a flight from developer-feeding carriers under an oscillating electric field during the second and subsequent developments. Thus, the toner adheres to the retainer, and this process is called noncontact development. Although the toner is caused to fly under the control of the oscillating field in a noncontact manner as described above for permit superimposition of toner images on the retainer, it is still likely that the powdered toner previously stuck to the retainer is transferred back to the developer-feeding carriers or the previously formed toner images are disturbed by the action of the electric field. This makes it impossible to vividly reproduce colored images. The phase of the AC component of the oscillating electric field produces an electric force that acts on the toner existing between the retainer and each carrier in the direction to move it from the carrier to the retainer, plus a second electric force acting on the toner in the opposite direction. The aforementioned undesired phenomenon is explained by this second force. If the DC component of the oscillating field is adjusted to prevent the toner from being transferred back, fog will immediately be produced. Hence, it is quite difficult to control the travel of toner particles by the oscillating field in such a way that neither back-transfer nor fog takes place.

SUMMARY OF THE INVENTION

In view of the foregoing problems produced in forming images by superimposing toner images on an image retainer, it is the main object of the present invention to provide an image-forming method which permits powdered toner to travel while preventing the occurrence of fog and back-transfer under the control of an oscillating electric field, and which is therefore capable of reproducing color images stably and vividly without creating the possibility that previously formed toner images are disturbed later or that toners of wrong colors are admitted into developing devices.

The above object can be attained by a method of forming an image comprising the steps of forming a latent image on an image retainer, flying toner particles from a developer feeding carrier to attach on said image retainer under an oscillating electric field, repeating the steps of the above to superpose a plurality of toner images on said image retainer by using toner particles different in every steps, wherein an electrical attracting force for attracting charged toner particles on said developer feeding carrier to said image retainer becomes larger according to the increase of the number of the repetition of the above steps.

The above object can also be attained by a method of forming an image comprising the steps of forming a latent image on an image retainer, flying toner particles from a developer feeding carrier to attach on said image retainer under an oscillating electric field, repeating the steps of the above to superpose a plurality of toner images on said image retainer by using toner particles different in every steps, wherein a flying force of the toner particles flying from said developer feeding carrier to said image retainer becomes smaller according to the increase of the number of the repetition of the above steps.

The above object can also be attained by a method of forming an image comprising the steps of forming a latent image on an image retainer, flying toner particles from a developer feeding carrier to attach on said image retainer under an oscillating electric field, repeating the steps of the above to superpose a plurality of toner images on said image retainer by using toner particles different in every steps, wherein such an image forming condition that the toner particles formed on said image retainer is not separated from said image retainer in sequential steps is set.

In summary, the image-forming method according to the invention comprises the steps of: forming latent images on an image retainer; causing a powdered toner to fly from a developer-feeding carrier in the presence of an oscillating electric field so that the toner may adhere to the retainer; and carrying out similar steps using different toners to superimpose a plurality of toner images on the retainer. This process is characterized in that the toners are subjected to weaker magnetic forces as later steps are carried out. Specifically, in each development done to form one image, the developer-feeding carrier exerts a magnetic force on the toner, and this force is made weaker as later steps are performed. This allows powdered toners to fly under the control of the oscillating field without introducing fog or back-transfer. Accordingly, toner images can be stably superimposed on the retainer.

An embodiment of the invention resides in an image-forming method comprising the steps of: forming a latent image on an image retainer; causing a powdered toner to fly from a developer-feeding carrier to the retainer at a developing station in the presence of an oscillating electric field so that the toner may adhere to the latent image; carrying out similar steps using different powdered toners; whereby superimposing toner images on the retainer. This embodiment is characterized in that the quantity of toner conveyed from the carrier to the developing station per unit time is made larger as later steps are carried out. This permits the toner to travel without transferring back to the carrier and without producing fog under the control of the oscillating field, thereby achieving the object described above.

Another embodiment of the invention resides in an image-forming method comprising the steps of: forming a latent image that has a potential of a two-dimensional distribution on the surface of an image retainer; causing a powdered toner to fly from a developer-feeding carrier in the presence of an oscillating electric field so that the toner may adhere to the latent image; carrying out similar steps using different powdered toners to superimpose toner images on the retainer. This embodiment is characterized in that the latent images are created to form potential distributions having larger contrasts as later steps are carried out, thereby accomplishing the aforementioned object.

A further embodiment of the invention resides in an image-forming method comprising the steps of: developing latent images one after another in the presence of an electric field containing an AC component to superimpose toner images on an image retainer. This embodiment is characterized in that the waveform of the AC component is made to have a larger amount of high harmonic component as earlier developments are carried out, thereby attaining the above-described object.

The AC component of the electric field used for the developing steps has a constant period. That is, when it is represented in terms of Fourier series, it follows that the fundamental component has a constant period. As earlier developing steps are conducted, the waveform is made closer to a pulse waveform, i.e., it has many high harmonic components. As later developing steps are carried out, the waveform is rendered closer to the fundamental component, i.e., it has a less number of high harmonic components.

In general, an electric field having a constant period can be given by $$\sum_{n=1}^{\infty} A_n \sin(n\omega t + \phi_n)$$

where $\omega$ is the frequency of the fundamental component, t is time, $A_n$ and $\phi_n$ are the amplitude and the frequency, respectively, of the harmonic component of the n-th order. When toner is placed in the electric field as given above, a vibrational energy proportional to $$\omega = \frac{1}{T} \int_0^T \left( \sum_{n=1}^{\infty} A_n \sin(n\omega t + \phi_n) \right)^2 dt$$

is imparted to the toner. Accordingly, even when the period and the amplitude are constant, if a development is carried out in the presence of an electric field having many harmonic components, i.e., having a waveform close to a rectangular wave, then a stronger vibrational energy is given to the toner. Thus, the toner can readily move away from the developer-feeding carrier, but after it has adhered to a latent image surface on the retainer, it does not easily settle itself in that location. Rather, it tends to return to the carrier. On the other hand, if the AC component of the field has a less number of harmonic components, i.e., it is close to a sinusoidal wave, then the toner does not readily move away from both the carrier and the retainer. Also, when it is stuck to the retainer, a smaller impact is created.

The method according to the invention utilizes this phenomenon. More specifically, when latent images are developed to superimpose the images on an image retainer in earlier steps, an electric field having an AC component similar to a rectangular wave is set up at a developing station. In later developing steps, however, the waveform of the AC component is made closer to a sinusoidal wave to eliminate the possibility that previously formed toner images are disturbed in the later developing steps or that toners of wrong colors are introduced into developing devices which are to be used for later developing steps.

Other objects and features of the invention will be seen by reference to the ensuring description, taken in connection with the accompanying drawings.

BRIEF DESCRIPTION OF THE DRAWINGS

FIGS. 3 and 5 are schematic diagrams of multicolor image printer for carrying out other image-forming methods according to the invention; and FIGS. 4(a) to 4(c) are waveform charts showing AC components of an electric field for development.

DESCRIPTION OF THE PREFERRED EMBODIMENTS

Figure 1:
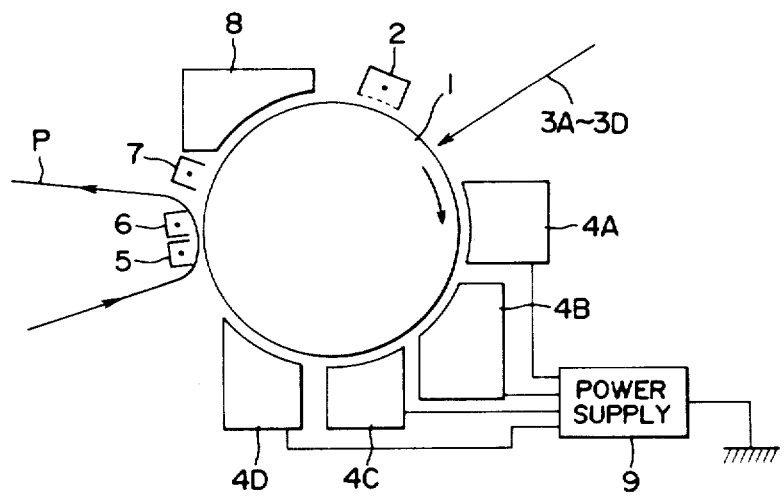
FIG. 1 is a schematic diagram of a printer for carrying out a method according to the present invention.
Figure 2:
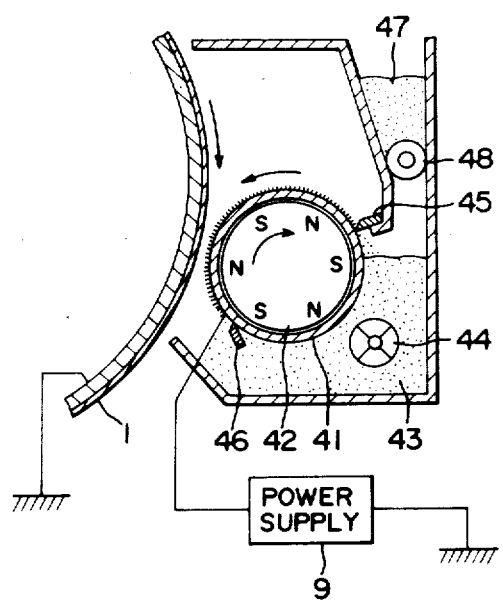
FIG. 2 is a partially sectional view showing the structure of a developing device.

Referring first to FIG. 1, there is shown a printer for carrying out a method embodying the concept of the present invention. This printer includes an image retainer 1 in the form of a drum. The retainer 1 has a photosensitive layer on its surface, and rotates in the direction indicated by the arrow. The surface of the retainer is uniformly charged electrically by a charging device 2 which consists of a scorotron in the illustrated example. Light 3A associated with one color is caused to strike the charged surface to form an electrostatic image. Then, to develop it, a toner of a color corresponding to the light 3A is applied to the electrostatic image from a developing device 4A constructed as shown in FIG. 2. The surface having the toner image is caused to pass by developing devices 4B, 4C, 4D, a transfer device 5, and a separator 6 without being worked upon by these devices. The developing devices 4B, 4C and 4D are similar in structure to the developing device 4A, and receive toners of different colors, respectively. Then, the electric charge on the surface is dissipated by a charge-eliminating device 7. Subsequently, the surface from which the charge has been removed is uniformly charged again by the charging device 2 without being acted upon by a cleaning device 8. Thereafter, light 3B regarding another color is projected onto this charged surface to form another electrostatic image. This image is then developed by the developing device 4B. Similar steps are carried out to form images until the final development is done by the developing device 4D. Thus, a colored image consisting of the superimposition of color toner images is formed on the surface of the retainer 1. Paper P is moved into contact with the surface of the retainer 1 in synchronism with it, and the multi-colored image is transferred to the paper by the transfer device 5. Then, the paper is separated from the surface of the retainer 1 by the separator 6, and the colored image is fixed to the paper by a fixing device (not shown). Subsequently, the charge on the surface of the retainer from which the colored image has been transferred is removed by the charge-eliminating device 7, after which the remaining, powdered toner is removed by the cleaning device 8. Thus, the whole process of printing the colored image is completed.

It is to be noted that all the charge-removing operations carried out by the charge-eliminating device 7 can be omitted except for the final one. In this case, when a powdered toner is stuck to areas on which light falls for reversal development, if this light does not cause a dot development in the same positions, then the electrically charging operations performed by the charging device 2 can be omitted except for the first charging.

During the image-forming method as described above, a developer-feeding carrier 41 that is incorporated in each of the developing devices 4A-4D and has a magnet member 42 therein, as shown in FIG. 2, exerts a magnetic force on the powdered toner on the developer layer formed on the carrier. This magnetic force is made weaker as later developments are made, and an oscillating electric field is applied between the carrier 41 and the image retainer 1 by a power supply 9, in order that the powdered toner fly from the carrier 41 to the retainer 1 in such a way that neither the back-transfer of the toner nor fog is produced. Consequently, toner images of different colors can be stably superimposed on the retainer 1.

The magnetic force that the carrier 41 exerts on the toner is made weaker in the manner described below as later developments are carried out:

(1) the magnetic flux densities between the north and south poles of the developing devices 4A-4D are made smaller in turn in this order; (2) the ratios of the magnetic material contained in the toners for the developing devices 4A-4D are made smaller in turn from the devices 4A to 4D; or (3) the measures (1) and (2) are taken at once. The power supply 9 applies the same or different bias voltages to the carriers 41 of the developing devices 4A-4D to set up the oscillating electric field between each carrier and the retainer 1 that has its body grounded.

The structures and the operations of the developing devices 4A-4D are now described in greater detail by referring to FIG. 2, where the developer-feeding carrier 41 is made from a nonmagnetic, electrically conductive material such as aluminum or stainless steel, and rotates in a counterclockwise direction. The magnet member 42 within the carrier rotates in a clockwise direction. Thus, a developer layer that moves in the direction indicated by the arrow is formed on the surface of the carrier 41. The magnet member 42 inside the carrier 41 has the north and south poles which exert a magnetic force on the powdered toner on the developer layer. Either the carrier 41 or the magnet member 42 can make stationary.

The developer in a developer container 43 preferably consists of a two-component developer that is a mixture of a magnetic powdered carrier and a powdered toner, because the quantity of the magnetic material contained in the toner can be reduced to a minimum necessary for the aforementioned controlled travel of the toner, but it can also be a one-component developer that does not contain magnetic powdered carrier. The developer held in the container 43 is stirred by a stirring means 44, and the toner is electrically charged by friction. The average amount of the charge on the toner preferably ranges from 5 to 50 $\mu C/g$. When a two-component developer is used, it is easy to charge the toner within this range. Therefore, the travel of the powdered toner can be readily controlled by the oscillating electric field.

The above-described developer in the developer container 43 is attracted to the surface of the developer-feeding carrier 41 by the magnetic force of the magnet member 42 to form the developer layer that moves in the direction indicated by the arrow as mentioned previously. The thickness of the layer is limited by a blade 45. The electrostatic image on the retainer 1 is developed at a developing station where the carrier 41 is opposite to the surface of the retainer 1.

The space between the carrier 41 and the retainer 1 at the developing station is set so as not to allow the developer layer formed on the carrier 41 to make contact with the surface of the retainer 1, and it is desired that the value lies in the range tends to 2,000 $\mu m$. Accordingly, the thickness of the developer layer that is limited by the blade 45 is made smaller than this value. However, if the space at the developing station is narrowed excessively, the thickness of the layer must be made quite small, which will render it impossible to make the thickness of the layer uniform. Therefore, toner cannot be stably supplied to the developing station. Further, electric discharge tends to occur between the carrier 41 and the retainer 1, damaging the developer and increasing the possibility that the toner is scattered. On the other hand, if the space at the developing station is made too large, the travel of toner cannot be controlled by the oscillating field.

When two-component developers are used, the magnetic powdered carriers preferably exhibit insulating property, i.e., their resistivity is in excess of $10^8$ $\Omega cm$, more preferably in excess of $10^{13}$ $\Omega cm$, to prevent the occurrence of electric discharge between the carrier 41 and the retainer 1 and to facilitate controlling the travel of toner by the oscillating electric field. The powdered carriers are coated with a resinous film or consist of resinous particles in which magnetic particles are dispersed. It is to be noted that the resistivity of the insulating particles is measured by putting the particles into a container having a cross-sectional area of 0.5 $cm^2$, tapping it, then applying a load of 1 $Kg/cm^2$ to the stuffed particles, applying a voltage to produce an electric field of 1,000 V/cm between the load and the bottom electrode, and reading the value of the resulting current. At this time, the carrier particles are tapped to a thickness of about 1 mm. Preferably, the developer-feeding carrier 41 is coated with an insulating or somewhat insulating film such as a resinous or oxide film to prevent the occurrence of electric discharge.

By satisfying the above conditions about the developing devices 4A-4D, a bias voltage which is the sum of appropriate AC and DC voltages can be applied to the developer-feeding carrier 41 by the power supply 9 without introducing any difficulty. This bias voltage cooperates with the aforementioned magnetic force, which is produced by the carrier 41 and exerts on the toner, to ideally control the travel of the flying toner. To superimpose the toner images with good resolution and vividly, the average diameter of the toner particles of the developer is preferably less than 20 μm, more preferably from 1 to 10 μm. When two-component developers are used, the average diameter of the carrier particles preferably lies in the range 5 to 50 μm. The average diameter of the particles is a weight average diameter of the particles, and is measured by an instrument as manufactured by Calter Inc. under the product name Calter Counter or by Bosch & Rohm Inc. under the product name Omnicon Alpha. When the average diameter of the toner particles is too small, the quantity of electric charge given to each toner particle by friction is small, and the van der Walls force assumes a large value in inverse proportion to that quantity. The result is that the particles tend to collect together, and therefore they cannot readily separate from each other and fly. Inversely, when the average diameter of the particles is too large, the quantity of electric charge per unit weight is small. This makes it difficult to control the travel of the particles. Further, a good resolution cannot be obtained. When the average diameter of the carrier particles is too small, the magnetic, attracting force exerted by the magnet member 42 is small, but the electrical Coulomb force and the van der Waals force are large. Therefore, the carrier particles can easily migrate to the surface of the image retainer 1 together with the toner particles. Inversely, when the average diameter of the particles is too large, the developer layer formed on the feeding carrier 41 will be coarse. This makes it difficult to form the developer layer uniformly as a thin film. In addition, the condition of adhesion of the toner particles on the developer layer is not uniform. Further, a breakdown in the voltage applied to the carrier 41 and electric discharge tend to occur. Consequently, it is difficult to control the travel of toner particles.

The electrostatic image on the image retainer 1 is developed by the developer layer on the carrier 41 at the developing station as mentioned above. The remaining developer layer is scraped off from the surface of the carrier 41 by a cleaning blade 46, and then it is returned to the developer container 43. A toner hopper 47 supplies toner to the container 43 via a toner replenishment roller 48 to make up the toner consumed by development. The present invention is carried out as described thus far. More detailed examples of the invention are next described.

EXAMPLE 1

The printer shown in FIGS. 1 and 2 was used. The image retainer 1 had a photosensitive layer of Se on its surface. The diameter of the retainer was 120 mm, and it was rotated in the direction indicated by the arrow at a surface velocity of 120 mm/sec. The retainer was electrically charged uniformly to 600 V by the charging device 2. The light 3A–3D for development was dot exposure light produced by modulating a He—Ne laser beam. Each developer-feeding carrier 41 of the developing devices 4A–4D had a diameter of 30 mm. During development, the carrier 41 was rotated in a counter-clockwise direction at a surface velocity of 120 mm/sec, and the magnet member 42 was rotated in a clockwise direction at 600 rpm. The developing sleeve 41 and the magnet member 42 were at rest except during development. The maximum magnetic flux density at the surface of the carrier 41 was 800 G, similarly to the developing devices at 4A–4D.

Steps similarly done to form images resided in forming negative latent images by means of light 3A–3D for exposure and causing toners to adhere to the areas on which the light 3A–3D fell by the developing devices 4A–4D. That is, these steps utilized reversal development.

One-component developers consisting of toner particles having an average diameter of 10 μm were used for the developing devices 4A–4D. The developers, or toner particles, for the developing devices 4A–4D had the following compositions:

| Developer 4A: black powdered toner | |
|---|---|
| polyester resin | 70 wt. % |
| powdered ferrite | 40 wt. % |
| carbon black | 10 wt. % |
| electric charge-controlling agent | 1 wt. % |
| Developer 4B: powdered Cyan toner | |
| polyester resin | 80 wt. % |
| powdered ferrite | 30 wt. % |
| phthalocyanine (blue) | 10 wt. % |
| electric charge-controlling agent | 1 wt. % |
| Developer 4C: powdered magenta toner | |
| polyester resin | 80 wt. % |
| powdered ferrite | 25 wt. % |
| rhodamine lake pigment | 10 wt. % |
| electric charge-controlling agent | 1 wt. % |
| Developer 4D: yellow powdered toner | |
| polyester resin | 80 wt. % |
| powdered ferrite | 20 wt. % |
| Hansa (yellow) | 5 wt. % |
| electric charge-controlling agent | 1 wt. % |

For any of the developing devices 4A–4D, the toner particles were electrically charged to +2 to 5 μC/g on the average. The amount of electric charge on each toner particle ranged from negative to positive values. The space between the developer-feeding carrier 41 of each of the developing devices 4A–4D and the retainer 1 was set to 0.8 mm, or 800 μm. The thickness of the developer layer was 0.5 mm. When developments were made by the developing devices 4A–4D, a DC voltage of 500 V and an AC voltage as listed in Table 1 were simultaneously applied to the carrier 41 by the power supply 9.

TABLE 1

| | Developing device | | | | | | | |
|---|---|---|---|---|---|---|---|---|
| | 4A | | 4B | | 4C | | 4D | |
| | Ampl. (KV) | Freq. (KHz) | Ampl. (KV) | Freq. (KHz) | Ampl. (KV) | Freq. (KHz) | Ampl. (KV) | Freq. (KHz) |
| Run 1 | 2 | 3 | 2 | 3 | 2 | 3 | 2 | 3 |
| Run 2 | 2 | 3 | 1.8 | 3 | 1.6 | 3 | 1.5 | 3 |
| Run 3 | 1 | 1.5 | 1 | 1.7 | 1 | 2.0 | 1 | 2.5 |

(Note that each amplitude was measured from the central value.)

Colored images were printed under the above conditions, and vivid colored images could be reproduced stably at all times without disturbing any color toner image for all the runs 1–3. Especially, for runs 2 and 3, the obtained colored images were good in color balance and excellent in vividness.

EXAMPLE 2

The same conditions as in Example 1 were adopted except for the following conditions. The magnetizations of the north and south poles of the magnet member 42 in each of the developing devices 4A–4D were different from each other to very the magnetic flux density on the surface of the carrier 41. Also, the space between each carrier 41 and the image retainer 1 and the thickness of the developer layer were changed among the developing devices 4A–4D, as shown in Table 2.

TABLE 2

| Condition | Developing Device | | | |
|---|---|---|---|---|
| | 4A | 4B | 4C | 4D |
| Maximum Magnetic Flux Density (G) | 1000 | 900 | 800 | 700 |
| Space (mm) | 0.5 | 0.6 | 0.7 | 0.8 |
| Thickness (mm) | 0.3 | 0.4 | 0.5 | 0.6 |

Setting aside the kind of coloring component, all of the developing devices 4A–4D used the one-component developer of the same composition as the powdered magenta toner in Example 1. The developers used for the developing devices 4A–4D were yellow powdered toner, powdered magenta toner, powdered Cyan toner, and black powdered toner, respectively. A DC voltage of 500 V and an AC voltage having an amplitude of 1.5 KV and a frequency of 2 KHz were simultaneously applied to all the carriers 41 of the developing devices 4A–4D.

Colored images were reproduced under the above conditions, and vivid colored images where any of the color toner images was not disturbed were obtained. Further, after many copies were produced, no change was observed in their image quality.

The examples described thus far rely on reversal development, but the invention is not limited to this. For example, ordinary development may also be utilized to form images. Further, as already pointed out, two-component developers may be used. Furthermore, the invention may be applied to a system in which an image retainer has a transparent, insulating layer on a photosensitive layer to form an electrostatic latent image. Additionally, the invention may be applied to an electrostatic printer or magnetic printer. It is also to be understood that the toner images superimposed on the image retainer can be transferred to paper by utilizing tackiness as well as by electrostatical process.

According to the invention, during developments in which toner images are superimposed on the image retainer, the developer-feeding carriers exert a magnetic force on toner particles, and this force is made weaker as later developments are performed. This facilitates controlling the travel of toner particles by an oscillating electric field. Accordingly, toner images can be readily superimposed to form a complete toner image without disturbing previously formed toner image and without producing fog. Hence, colored images can be reproduced stably and vividly.

As a yet further example of the invention, the developing devices 4A–4D constructed as shown in FIG. 2 perform developing operations in turn in the printing steps as mentioned previously. At this time, the quantity of toner which is supplied to the narrow developing station between the retainer 1 and each carrier 41 of the devices 4A–4D by these carriers per unit time is increased as later developments are conducted. Therefore, as later developments are done, it becomes easier to move toner particles from the carrier 41 to the retainer 1 in the presence of the oscillating electric field. This field serves to prevent occurrence of fog and back-transfer of the toner. Consequently, toner images of different colors are superimposed on the retainer 1 stably without disturbance.

This is described in greater detail by referring to FIG. 2. The amount of toner supplied to the developing station is controlled by adjusting the thickness of the developer layer by means of the blade 45, by adjusting the velocity at which the developer layer is moved, or, where the developer is a mixture of toner particles and carrier particles, by varying the ratio of the toner in the developer. The velocity of the movement of the layer can be adjusted by altering one or both of the rotating frequencies of the carrier 41 and the magnet member 42. When the thickness of the developer layer is changed, the amount of toner supplied also relates to the gap between the develoer layer and the surface of the retainer 1 or the gap between the carrier 41 and the surface of the retainer 1 and so the result of a change in the amount of toner supplied cannot be forecasted easily. Therefore, it is desired that the velocity of the developer layer or the ratio of the toner in a two-component developer be changed; otherwise these two methods may be used simultaneously.

In order to prevent unnecessary toner particles from adhering to the image retainer 1 and to keep the toner already forming a toner image from transferring back to the developing device, the rotation of the carrier 41 and the magnet member 42 in each developing device not contributing to development is preferably stopped so as not to move the developer layer.

The power supply 9 applies the same or different bias voltages to the developer-feeding carriers 41 of the developing devices 4A–4D to produce an oscillating electric field between each carrier and the image retainer 1 whose body is grounded. As stated above, the amount of toner supplied to the developing station by the carrier 41 is increased as later developments are carried out. Thus, the oscillating field enables every development to be stably done without disturbing previously formed toner images and without producing fog. Also in this case, it is desired that the AC component of the bias voltage be not applied to those developing devices not involved in development, in order to prevent both adhesion of unwanted toner particles to the retainer 1 and back-transfer of toner particles already forming toner images to the developing devices.

EXAMPLE 3

The printer shown in FIGS. 1 and 2 was used under the same conditions as in Example 1 except that the distance between each carrier 41 of the developing devices 4A–4D and the retainer 1 was set to 0.5 mm, or 500 μm. Two-component developers were employed for the developing devices 4A–4D. These developers consisted of insulating powdered carriers which were coated with styrene or acrylic resin. The average diameter of the particles of the carriers was 20 μm, and silica was appropriately added to them. The toner particles consisted of polyester resin in which coloring agent and electric charge-controlling agent were dispersed. The average diameter of the toner particles was 12 μm. Yellow powdered toner, powdered magenta toner, powdered Cyan toner, and black powdered toner were received in the developing devices 4A–4D, respectively. The ratio of the toners in their respective developers was 20% by weight. The average amount of electric charge on the toner particles in each developer container 43 for the developers was 20 μC/g.

During development, all the developing-feeding carriers 41 of the developing devices 4A–4D were rotated in their respective devices 4A–4D in a counterclockwise direction, and their surface speeds were 180 mm/sec, 200 m/sec, 220 mm/sec and 250 mm/sec, respectively. All the magnet members 42 were rotated in a clockwise direction at 600 rpm. A developer layer which was moved by each carrier 41 at a speed proportional to the carrier was formed to a thickness of 0.3 mm on the surface of the carrier 41 by the blade 45. The power supply 9 applied bias voltages that were the combination of a DC voltage of 500 V and the respective AC voltages listed in Table 3 during the developing operations.

TABLE 3

| | Developing Device | | | | | | | |
|---|---|---|---|---|---|---|---|---|
| | 4A | | 4B | | 4C | | 4D | |
| | Ampl. (KV) | Freq. (KHz) | Ampl. (KV) | Freq. (KHz) | Ampl. (KV) | Freq (KHz) | Ampl. (KV) | Freq. (KHz) |
| Run 4 | 0.5 | 0.8 | 0.5 | 0.8 | 0.5 | 0.8 | 0.5 | 0.8 |
| Run 5 | 2 | 3 | 1.8 | 3 | 1.5 | 3 | 1.2 | 3 |
| Run 6 | 1 | 1.2 | 1 | 1.5 | 1 | 2 | 1 | 2.5 |

Toner images were formed by producing negative latent images by the projection of light 3A–3D for development and causing toner particles to adhere to areas on which the light 3A–3D fell, using the developing devices 4A–4D. That is, reversal development was utilized.

Colored images were printed under the conditions described above. For all the runs 4–6, vivid colored images could be stably reproduced, i.e., the toner images of the different colors were not disturbed. Especially for runs 5 and 6, the obtained colored images were good in color balance and excellent in vividness.

EXAMPLE 4

Colored images were reproduced under the same conditions as in Example 3 except for the following conditions. During every developments, the developer-feeding carriers 41 of the developing devices 4A–4D were rotated in a counterclockwise direction at the same surface velocity of 220 mm/sec. The ratios of the toner particles contained in the two-component developers received in the developing devices 4A–4D were 15%, 18%, 20%, and 24% by weight, respectively. Thus, the quantity of toner furnished to the developing station was increased in turn. Colored images could be reproduced stably and vividly for all the runs 4–6 in the same manner as in Example 3. No disturbances could be observed in the toner images of various colors.

EXAMPLE 5

The conditions adopted were the same as in Example 3 except for the following conditions. During developments, the developer-feeding carriers 41 in the developing devices 4A–4D were rotated counterclockwise, and the magnet members 42 were turned clockwise. Their surface speeds were set as listed in Table 4. The ratio of all the toners in the developers was 15% by weight.

TABLE 4

| | Developing Device | | | |
|---|---|---|---|---|
| Condition | 4A | 4B | 4C | 4D |
| Surface Speed of Carrier (mm/sec) | 180 | 200 | 220 | 250 |
| Magnet Member (rpm) | 450 | 600 | 600 | 750 |

Colored images were reproduced under the above conditions, and vivid colored images could be obtained for all the runs 4–6 in Table 3, i.e., no disturbances occurred in the toner images of different colors. Further, it was found that no changes in color and in print quality could be observed after many copies were created.

The above-mentioned Examples 3–5 all relied upon reversal development. The invention is not limited to this, and it is possible to form images by ordinary development. Also, one-component developers consisting of magnetic toner particles can be used.

In this example of the invention, the amount of toner supplied to the developing station by each developer-feeding carrier to superimpose toner images on the image retainer is increased as later developing operations are performed. This facilitates controlling the travel of toner particles by the oscillating electric field during every development without producing fog or back-transfer. Consequently, colored images can be stably and vividly reproduced.

As a still other example of the invention, the potential difference between areas on which light falls for development and areas on which no light falls is increased, i.e., the contrast is increased, as later developing operations are performed to derive toner images from electrostatic images formed on the retainer 1. This can be easily achieved by causing the charging device 2 to uniformly charge the retainer 1 at stronger intensities as later toner image-forming steps are carried out. Although the same result would be obtained by increasing the contrast between the light 3A–3D for development as later image-forming steps are carried out, the method using the charging device 2 is most preferable in that it is simple and can be used in wide applications. By forming electrostatic images in this way, these images can be readily developed and, accordingly, the travel of toner particles can be easily controlled by the oscillating electric field in such a way that the toner does not transfer back to the developing device and that fog is not produced. Hence, toner images can be superimposed on the retainer 1 without disturbing them or mixture of colors, thus giving rise to a vivid, superimposed toner image.

By adding the preferred conditions described above to the image-forming process in which latent images are successively formed with successively increased contrast, further vivid color images can be reproduced.

EXAMPLE 6

The printer as shown in FIGS. 1 and 2 was used under the same conditions as in Example 1 except for the following. The gap between each developing sleeve 41 of the developing devices 4A-4D and the image retainer 1 was set to 0.7 mm, or 700 $\mu$m. Two-component developers which were mixtures of toner particles and carrier particles were used for the developing devices 4A-4D. The toner particles had an average diameter of 10 $\mu$m, and consisted of polyester resin in which coloring agent and electric charge-controlling agent were dispersed. The carrier particles had an average diameter of 30 $\mu$m, and consisted of a styrene or acrylic resin in which powdered ferrite was dispersed. Silica was stuck to the surface of each carrier particle. The toner particles for the developing devices 4A-4D were yellow pigment, magenta, Cyan, and black pigment, respectively. The ratio of the toner particles in the two-component developers was 20% by weight.

The developers in the developer containers 43 of the developing devices 4A-4D were so selectively charged that the amount of electric charge on the toner particles reached +20 to 30 $\mu$C/g. A developer layer of 0.5 mm thick was formed on each developing sleeve 41 by the blade 45. The developing devices 4A-4D caused the charging device 2 to charge the surface of the image retainer 1 to 500 V, 600 V, 700 V, and 800 V in turn, and then electrostatic images were produced by exposing the surface to light 3A-3D. The bias power supply 9 applied bias voltages which were combinations of the DC components of 400 V, 500 V, 600 V, and 700 V, respectively, and the AC components listed in Table 1 to the developing sleeve 41 to develop the images. The potential on the areas of electrostatic images which were exposed to light was 20 V.

Colored images were reproduced under the conditions shown in Table 1, and it was found that the toner image of any color experienced no disturbance for all the runs 1-3. Hence, all the colored images could be reproduced stably and vividly. Especially for the runs 2 and 3, the obtained colored images were good in color balance and excellent in vividness.

EXAMPLE 7

Colored images were reproduced under the same conditions as in Example 6 except for the following conditions. Slits were provided so that the light 3A-3D for different colors passes through their respective slits in the same way as in ordinary electrostatic copiers to form positive latent images. Then, tone particles were caused to adhere to the unexposed areas by the developing devices 4A-4D. One-component developers consisting of toner particles were used for the developing devices 4A-4D. The toner particles consisted of polyester resin containing powdered ferrite, coloring agent, and electric charge-controlling agent. The average diameter of the particles was 15 $\mu$m. The amount of electric charge on each toner particle in the developer container 43 of the developing devices 4A-4D ranged from negative to positive values. The average value was $-5$ to $-2$ $\mu$C/g. Bias voltages which were combinations of a DC voltage of 100 V and the AC components in Table 1 were applied to the developing sleeves 41 of the developing devices 4A-4D. Colored images were reproduced under the above conditions, and vivid colored images in which the toner images of different colors were not disturbed were derived. No change was seen in the print quality after a number of copies were made.

In one aspect of the present invention, latent images are produced with successively increased contrast as later image-forming steps are carried out. This permits every development to be made in the presence of the oscillating electric field without producing back-transfer of toner particles or fog. Hence, vivid colored images can be stably reproduced without incurring disturbance of images and intrusion of wrong colors.

It is to be understood that the present invention may be also applied to a printer in which an image retainer has a transparent, insulating layer on a photosensitive layer to form electrostatic latent images. Further, it may be applied to a system in which toner images are transferred to paper under pressure making use of viscous transfer. In addition, it may be applied to an electrostatic printing system in which electric charges are directly injected into an image retainer to form electrostatic images. Furthermore, it may be applied to printers in which non-electrostatic latent images such as magnetic latent images are developed.

Figure 3:
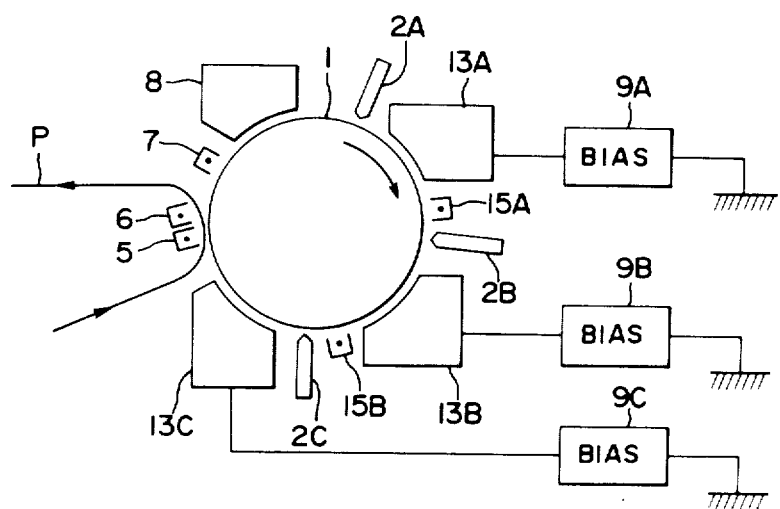

Referring next to FIGS. 3-5, there is shown a yet further example of the invention. It is to be noted that those components of the color printer shown in FIG. 3. which are the same as those in FIGS. 1 and 2 are indicated by the same reference numerals as in FIGS. 1 and 2. This printer has multi-stylus electrodes 2A-2C for injecting electric charges into the surface of the image retainer 1 that turns in the direction indicated by the arrow, in order to form electrostatic latent images, which are developed into toner images by developing devices 13A-13C. The structures of these devices 13A-13C are as shown in FIG. 2. Bias power supplies 9A-9C apply bias voltages to the developing sleeves 41 of the devices 13A-13C to set up an electric field at the developing station between the retainer 1 and each sleeve 41, each bias voltage being either an AC voltage or the combination of an AC voltage and a DC voltage. Charge-eliminating electrodes 15A and 15B act to remove electric charge from the surface of the image retainer 1 on which a development was previously made, in order that electrostatic latent images be smoothly formed by the electrodes 2B and 2C, respectively.

In this example, the bias voltage applied to the developing sleeves 41 by the power supplies 9A-9C for development contain at first an AC component containing many high harmonic components as shown in FIG. 4(a) to produce an electric field containing an AC component at the developing station for the first development that is done by the developing device 13A, for example. Then, the AC component of the bias voltage is made to contain less high harmonic components as shown in FIG. 4(b) than the wave of FIG. 4(a), for the next development which is made by the developing device 13B, for instance. Finally, the AC component of the bias voltage is made either to contain further less high harmonic components or to consist of only its fundamental component for the last development that is carried out by the developing device 13C. This eliminates the possibility that toner images previously formed on the retainer 1 are disturbed by later developments or that the toner particles already adhering to the retainer 1 transfer back to the developing sleeves 41 during later developments. As such, colored images can be reproduced stably and vividly. As mentioned previously, an appropriate DC voltage is added to the bias voltage, as a matter of course, in order to more strictly prevent occurrence of fog or back-transfer. The waveform of the AC component is shaped as shown in FIG. 4 to help prevent the occurrence of both fog and back-transfer, which would usually have been a trade-off. The high harmonic components can be controlled by providing an RC integrator circuit and changing its time constant.

When one of the developing devices 13A–13C is performing a developing operation, no bias voltage is, of course, applied to the sleeves 41 of the other devices. Also, the sleeve 41 and the magnet members 42 of the other devices are not rotated.

Also in the above example of the invention, developments are made by the developing devices 13A–13C preferably under the condition that toner particles fly from the developer layer formed on the developing sleeves 41 and adhere to the surface of the retainer 1 such that the developer layer does not make contact with the surface of the retainer 1. This yields better advantage than the process in which the developer layer makes a sliding contact with the surface of the retainer 1.

Referring next to FIG. 5, there is shown a two-color printer including an image retainer 1 that has a photosensitive layer on its surface for employing the principles of electrophotography. The surface of the retainer 1 is uniformly charged by a charging electrode (scorotron) 10. Light 11 is emitted by an exposure means (not shown) so that it strikes the charged surface to form an electrostatic latent image. This printer differs from the printer shown in FIG. 1 in that toner images of two colors are superimposed on the retainer 1 of FIG. 5 while the retainer is rotated twice. The resultant image is then transferred to paper P. More specifically, during the first revolution of the retainer 1, an electrostatic image is formed on the retainer 1 and a development is made by the developing device 13A, for example. The surface of the retainer 1 then passes by a transfer device 5 and a cleaning device 8 without being acted upon by these two means. Subsequently, the retainer enters into its second revolution, during which another electrostatic latent image is formed by the action of both the charging electrode 10 and light 11 for development. This latent image is developed by the developing device 13B. The superimposed toner images are then transferred and fixed to paper P in the same manner as in the printer of FIG. 3. Those members which are indicated by the same reference numerals as in FIG. 3 function in the same way as in FIG. 3. Where the exposure means which allows the light 11 to strike the retainer comprises a dot exposure means such as a laser beam scanner, the uniform charging by the charging electrode 10 during the second revolution may be omitted, in which case the charge-eliminating device 7 is deenergized and the retainer passes by this electrode without being worked upon by it during the first revolution. Where the uniform charging is again made by the charging electrode 10 during the second revolution, the charge-eliminating device 7 is not required to operate.

Also in the printer of FIG. 5, the first development by the developing device 13A is carried out in the presence of an electric field containing an AC component as shown in FIG. 4(a) or FIG. 4(b). The later development by the developing device 13B is performed in the presence of an electric field containing an AC component as shown in FIG. 4(b) or FIG. 4(c). This exhausts the possibility that toner images previously formed are disturbed by later developments or that toners of wrong colors are introduced due to back-transfer, in the same fashion in the printer shown in FIG. 3. Hence, two-color images can be stably and vividly printed. It is also desired for this printer that the toner particles travel from the developer layer such that this layer does not make contact with the surface of the image retainer. Further, two-component developers can preferably be used for this printer.

In the case of a two-color printer, for example, toner images of two colors can be superimposed during one revolution of the image retainer 1. In particular, an electrostatic image consisting of three levels, i.e., positive, negative, and zero levels, are formed on the surface of the retainer 1 using multi-stylus electrodes, for example. Toners which are oppositely charged are received in two developing devices, respectively. One of the developing devices acts to cause one toner to adhere to the areas of the latent image which are at the positive level. The other serves to cause the other toner to adhere to the areas of the image which are at the negative level. This method takes a reduced time to print a two-color image, and facilitates putting the two superimposed images into registry.

It is also possible to superimpose toner images of two colors with a single developing device as described in Japanese Patent Laid-open No. 50548/1983. The present invention is applicable to the printing of multi-color images as thus far described. Yet further example of the invention is described below.

EXAMPLE 8

The apparatus shown in FIGS. 2 and 3 was used. The image retainer 1 had a diameter of 120 mm, and rotated at a surface velocity of 120 mm/sec in the direction indicated by the arrow. Multi-stylus electrodes 2A–2C produced electrostatic latent images consisting of dots on the surface of the image retainer 1 at 400 V, −500 V, and 600 V, respectively. Each of the developing devices 13A–13C had a developing sleeve 41 made of nonmagnetic stainless steel. The sleeve 41 had a diameter of 30 mm, and rotated at a surface velocity of 120 mm/sec in a counterclockwise direction. The magnet member 42 had six magnetic poles that gave a magnetic flux density to the surface of the sleeve 41, and the maximum value of the magnetic flux density was 900 gauss. The sleeve turned at 800 rmp in the direction indicated by the arrow. The space between the retainer 1 and each sleeve 41 was 0.8 mm. Two-component developers were used for the developing devices 13A–13C. A commonly used carrier consisted of a thermoplastic resin in which powdered ferrite was dispersed and to which a fluidizer was added. The particle sizes were selected so as to range from 20 to 40 $\mu$m. The used toners each consisted of a thermoplastic resin in which coloring agent and electric charge-controlling agent were dispersed. The particle sizes of the toners were so selected that they ranged from 10 to 20 $\mu$m. The toners for developing devices 13A, 13B, and 13C were magenta, Cyan, and yellow pigment, respectively. The ratio of the carriers to the toners was 4:1 by weight. The average amounts of electric charge on magenta, Cyan, and yellow pigment were −15, 20, and −20 $\mu$C/g, respectively. The thickness of the developer layer on each sleeve 41 and the bias voltages for developing operations were set as listed in Table 5 to print colored images. The developments were made by the developing devices 13A, 13B, and 13C in this order. The AC components of the bias voltages had the waveforms as shown in FIGS. 4(a)–4(c) for the developing devices 13A–13C, respectively.

TABLE 5

| | Developing Device | DC Component (V) | AC Component Ampl. (KV) | AC Component Freq. (KHz) | Thickness of Layer (mm) |
|---|---|---|---|---|---|
| Run I | 13A | 0 | 2 | 2 | 0.3 |
| | 13B | 0 | 2 | 2 | 0.3 |
| | 13C | 0 | 2 | 2 | 0.4 |
| Run II | 13A | 0 | 1.2 | 1 | 0.2 |
| | 13B | −100 | 1.2 | 1.5 | 0.2 |
| | 13C | 100 | 1 | 1.5 | 0.3 |
| Run III | 13A | 0 | 2 | 3 | 0.4 |
| | 13B | 0 | 2 | 3 | 0.5 |
| | 13C | 100 | 2.5 | 3 | 0.5 |

(Note that an amplitude is half of a peak-to-peak value.)

The obtained colored images were vivid ones in which no disturbances of images and no mixing of colors were found for all the runs. The color reproducibility did not change after many copies were made.

In this example, the bias power supplies 9A–9C were used for the developing devices 13A–13C, respectively, but it is also possible to employ a single bias power supply in common. In this case, the waveform of the AC component can be varied by controlling the time constant of an integrator circuit.

dish coloring agent and a black or blackish coloring agent, respectively. In other respects, the toners were the same as those in Example 1. The red toner and black toner were used for the developing devices 13A and 13B, respectively. The ratio of the carriers to the toners was the same as that in Example 8. The red and black toners each had electric charge of 20 $\mu C/g$. The thickness of the developer layer on each sleeve 41 and the bias voltages were set as listed in Table 6, and two-color images were printed. The developments were made in red and then in black. The AC components of the bias voltages had the waveforms as shown in FIGS. 4(a) and

TABLE 6

| | Developing Device | DC Component (V) | AC Component Ampl. (KV) | AC Component Freq. (KHz) | Thickness of Layer (mm) |
|---|---|---|---|---|---|
| Run IV | 13A | 500 | 1.5 | 2 | 0.2 |
| | 13B | 500 | 1.5 | 2 | 0.2 |
| Run V | 13A | 500 | 1.2 | 1.5 | 0.2 |
| | 13B | 550 | 1.2 | 2 | 0.2 |
| Run VI | 13A | 500 | 1.5 | 2 | 0.3 |
| | 13B | 500 | 1.2 | 2 | 0.3 |
| Run VII | 13A | 450 | 2 | 3 | 0.3 |
| | 13B | 450 | 2 | 3 | 0.2 |

(Note that an amplitude is a half of a peak-to-peak value.)

EXAMPLE 9

The apparatus shown in FIGS. 2 and 5 was used. The image retainer 1 had a Se photosensitive layer and a diameter of 120 mm. The retainer was turned at a peripheral velocity of 180 mm/sec in the direction indicated by the arrow. The surface was electrically charged uniformly at 600 V by the charging electrode 10. Light 11 for exposure was emitted by a laser scanner incorporating a He-Ne laser. The developing sleeves 41 of the developing devices 13A and 13B had a diameter of 30 mm. During developments, the sleeves rotated at a peripheral velocity of 180 mm/sec in a counterclockwise direction. Each magnet member 3 had six magnetic poles that gave a magnetic flux density to the surfaces of the corresponding sleeves 41. The maximum value assumed by the magnetic flux density was 800 gauss. The members 3 rotated at 600 rpm in the direction indicated by the arrow. The space between the retainer 1 and each sleeve 41 was 0.5 mm. Electrostatic images formed by the light 11 in the two image-forming steps were negative latent images. The developing devices 13A and 13B made reversal developments, i.e., toners were stuck to exposed areas on the retainer 1. In this case, the exposed areas were at a potential of 0 to 50 V with respect to the corresponding image portions. The unexposed areas were at a potential of 550 to 600 V with respect to the corresponding nonimage areas. Two-component developers were used for the developing devices 13A and 13B. The carrier used was the same as in Example 8. Employed toners contained a red or red- 4(c) for the developing devices 13A and 13B, respectively.

The obtained two-color images were vivid for all the runs IV–VII in that no disturbances in images and no mixture of the colors were observed. Mixture of the colors or other undesired phenomena did not take place after copies were successively made.

In the above example, the two-component developers were employed, but it is also possible to use one-component developers. Further, ordinary development may be utilized instead of reversal development.

For comparison, the rectangular wave shown in FIG. 4(a) was used as the AC component of the bias voltage also during the development may be the developing device 13B. Disturbances of images and mixture of colors were conspicuous in the obtained two-color images. After many copies were created, a noticeable quantity of the red toner was mixed in the developing device 13B. This example of the invention ensures that vivid multi-colored images can be stably obtained since no disturbance of images and no mixture of colors take place.

As a modified embodiment of the invention, toners which are relatively electrically conductive are used to prevent the toner adhering to the image retainer from transferring back to the developing device during the next development. As an example, if the resistivity of the toner particles is less than $10^{13}$ $\Omega cm$, preferably in the range from $10^6$ to $10^{12}$ $\Omega cm$, the toner particles which have been pulled to the surface of the image retainer 1 by electrostatic induction under the control of the vibrating electric field will lose their electric charge in a short time because of the appropriately low resistance. Hence, it is unlikely that toner is moved back to the developing device by the action of the oscillating field or electrostatic attraction during later developments. Therefore, toner images can be superimposed without resulting in fog or addition of wrong colors. This permits vivid colored images to be formed on the retainer 1.

The resistivity of the toner particles was measured as follows. First, the particles were put into a container having a cross-sectional area of 0.5 cm$^2$ and then tapped. Subsequently, a load of 1 Kg/cm$^2$ was applied to the packed particles. A voltage was then applied between the load and the bottom electrode to produce an electric field of 1000 V/cm. The value of the current flowing at this time was read, and then the resistivity was calculated based on this value. The thickness of the packed toner particles was of the order of 1 mm.

The aforementioned low resistance of the toner particles can also be attained by either adding conductive powder to the resin besides the coloring agent or causing conductive powder to adhere to the surface of the retainer after granulation. Where the conductive powder exhibits magnetic property or magnetic powder is added, the toner particles will show magnetic property and so the toner will be used as a developer by itself. However, developers for use in the developing devices 4A-4D are not limited to this. A two-component developer which is a mixture of magnetic carrier particles and toner particles may also be employed.

The following embodiments could be considered in order to superimposing good images by preventing the color images from being compounded:

The amplitude $V_{AC}$ of the AC component of the bias volage applied to the developing devices was 1.5 KV and the potential of the DC component was 500 V. The frequencies of the AC component were set to 1.8, 2.0 and 2.5 KHz in the order of developments performed. These bias voltages were applied on the developing devices which were then carrying out developing operations. Those devices which were not involved in developing operations were grounded. The space d between the image retainer 1 and each developer-feeding carrier 41 was 0.8 mm. The thickness of the developer layer was 0.5 mm. Toners which were electrically charged to 20, 22, and 25 $\mu$C/g in the order of developments performed were received in their respective developing devices.

In the present example, the frequency of the AC bias voltage was increased in turn for every subsequent development, and the amount of electric charge on the toner used was also increased in turn, in order to prevent the toner already adhering to the retainer 1 from returning to the feeding carriers 41.

Multi-colored images were also formed according to the example described just above, and it was found that visible images of sufficient density were derived from the toner images without introducing such undesired phenomenon that toner images previously formed on the retainer were destroyed during subsequent developments or that toners of other colors intruded into the developing devices. Other examples using one-component developers for the developing devices are described below.

Toners which were electrically charged to 0, 5, and 10 $\mu$C/g in the order of developments carried out were received in the developing devices. Then, colored images were formed under the same conditions as the example described just above except for the amounts of electric charges. Although the average quantity of electric charge on the toner used for the first development was 0 $\mu$C/g, the quantity of charge on each toner particle varies widely due to their mutual friction, and the toner particles having the required charges were selected for development.

As a further example of the invention, the amplitudes $V_{AC}$ of the AC components of the bias voltages applied during developments were set to 2.0, 1.8, and 1.5 KV in the order or developments done, and the frequencies of the AC components of the bias voltages were set to 2.0, 2.2, and 2.5 KHz in the same order. This gradual increase in frequency prevents the toners from returning to the carriers. These bias voltages were applied to only those developing devices which were carrying out developing operations. Those developing devices which were not involved in development were grounded. The amount of electric charge on each toner was 20 $\mu$C/g. The retainer 1 was electrically charged to a potential of 600 V. The space d between the retainer 1 and the carrier 41 was 0.5 mm. The thickness of the developer layer on the periphery of the carrier 41 was 0.3 mm. A DC voltage of 500 V was applied to the developing devices. As a result, toner images of sufficient density were formed without destorying the toner images previously formed on the retainer 1 during subsequent developments and without adding toners or wrong colors to the developing devices.

What is claimed is:

1. In a method of forming an image comprising the steps of forming an electrostatic latent image on an image retainer, flying magnetic toner particles retained on a developer feeding carrier toward said image retainer under an oscillating electric field produced between said image retainer and said developer feeding carrier, repeating the steps of the above to superpose a plurality of toner images on said image retainer by using different colored toner particles in every step, the improvement wherein a magnetic attracting force, acting between said toner particles and a magnetic forming means provided in said developer feeding carrier, of each step is smaller than the magnetic attracting force of the previous step.

2. The method of forming an image according to claim 1 wherein a magnetic flux density of said magnetic field forming means of each step is smaller than the magnetic flux density of said magnetic field forming means of the previous step.

3. The method of forming an image according to claim 1 wherein the quantity of a magnetic material of each step included in said toner particles is smaller than that of the previous step.

4. The method of forming an image according to claim 1 wherein a frequency of an alternating current component of a developing bias voltage of each step applied on said developer feeding carrier is higher than the frequency of the previous step.

5. The method of forming an image according to claim 1 wherein an amplitude of an alternating current component of a developing bias voltage of each step applied on said developer feeding carrier is smaller than the amplitude of the previous step.

6. In a method of forming an image comprising the steps of forming an electrostatic latent image on an image retainer, flying toner particles retained on a developer feeding carrier toward said image retainer under an oscillating electric field produced between said image retainer and said developer feeding carrier, repeating the steps of the above to superpose a plurality of toner images on said image retainer by using different colored toner particles in every step, the improvement wherein the quantity of toner particles of each step fed through said developer feeding carrier per unit time is larger than the quantity of the previous step.

7. The method of forming an image according to claim 6 wherein a two-component developer comprising toner particles and insulating magnetic carrier particles is retained on said developer feeding carrier.

8. The method of forming an image according to claim 6 wherein the feeding speed of said toner particles of each step retained on the developer feeding carrier is higher than the carrier speed of the previous step.

9. The method of forming an image according to claim 8 wherein the rotary speed of said developer feeding carrier of each step is higher than the speed of the carrier of the previous step and wherein a magnetic forming means installed in said developer feeding carrier is rotated in opposite direction to and at the same speed as said developer feeding carrier.

10. The method of forming an image according to claim 6 wherein a layer of a developer including said toner particles on said developer feeding carrier after each step is thicker than that of the previous step.

11. The method of forming an image according to claim 7 wherein the mixing ratio in weight of said toner particles in said two-component developer including said toner particles after each step is larger than the mixing ratio of the previous step.

12. In a method of forming an image comprising the steps of forming an electrostatic latent image on an image retainer, flying toner particles retained on a developer feeding carrier toward said image retainer under an oscillating electric field produced between said image retainer and said developer feeding carrier, repeating the steps of the above to superpose a plurality of toner images on said image retainer by using different colored toner particles in every step, the improvement wherein a high harmonic wave component in a developing bias voltage of each step applied on said developer feeding carrier is smaller than that of the previous step.

13. The method of forming an image according to claim 12 wherein a two-component developer comprising toner particles and insulating magnetic carrier particles is retained on said developer feeding carrier.

14. The method of forming an image according to claim 12 wherein a layer of a developer including toner particles on said developer feeding carrier after each step is thicker than the layer of the previous step.

15. The method of forming an image according to claim 12 further comprising a C-R integration circuit means as an electric source of a developing bias voltage wherein the time constant of said integration circuit means is varied so that said high harmonic wave component is controlled.

16. In a method of forming an electrostatic latent image on an image retainer, flying toner particles including magnetic carrier particles retained on a developer feeding carrier toward said image retainer under an oscillating electric field produced between said image retainer and said developer feeding carrier, repeating the steps of the above to superpose a plurality of toner images on said image retainer by using different colored toner particles in every step, the improvement wherein a magnetic attracting force, acting between said carrier particles and a magnetic field forming means provided in said developer feeding carrier, of each step is smaller than the magnetic attracting force of the previous step.

17. In a method of forming an image comprising the steps of forming an electrostatic latent image on an image retainer, flying toner particles retained on a developer feeding carrier toward said image retainer under an oscillating electric field produced between said image retainer and said developer feeding carrier, repeating the steps of the above to superpose a plurality of toner images on said image retainer by using different colored toner particles in every step, the improvement wherein an electrical attracting force of each step for attracting charged toner particles on said developer feeding carrier to said image retainer is larger than the electrical attracting force of the previous step.

18. The method of forming an image according to claim 17 wherein a two-component developer having toner particles and insulating magnetic carrier particles is retained on said developer feeding carrier.

19. The method of forming an image according to claim 17 wherein a potential distribution difference of an electrostatic latent image of each step formed on said image retainer is larger than that of the previous step.

20. The method of forming an image according to claim 17 wherein the charge quantity for charging the surface of said image retainer of each charging step is larger than the charge quantity of the previous charging step.

21. The method of forming an image according to claim 17 wherein a charge of the toner particles of each step is larger than that of the previous step.

22. The method of forming an image according to claim 20 wherein a direct current component of a developing bias voltage of each step applied to said developer feeding carrier is larger than that of the previous step.

23. The method of forming an image according to claim 19 wherein the contrast of exposing quantity for forming an electrostatic latent image on said image retainer of each step is larger than that of the previous step.

24. The method of forming an image according to claim 16 wherein a magnetic flux density of said magnetic field forming means of each step is smaller than the magnetic flux density of said magnetic field forming means of the previous step.

25. The method of forming an image according to claim 16 wherein a frequency of an alternating current component of a developing bias voltage of each step applied on said developer feeding carrier is higher than the frequency of the previous step.

26. The method of forming an image according to claim 16 wherein an amplitude of an alternating current component of a developing bias voltage of each step applied on said developer feeding carrier is smaller than the amplitude of the previous step.

* * * * *